（12）United States Patent
Sato

(10) Patent No.: US 10,305,088 B2
(45) Date of Patent: May 28, 2019

(54) SECONDARY BATTERY AND METHOD FOR MANUFACTURING SAME

(71) Applicant: NEC ENERGY DEVICES, LTD., Sagamihara-shi, Kanagawa (JP)

(72) Inventor: Tetsuya Sato, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 0 days.

(21) Appl. No.: 14/904,735

(22) PCT Filed: Dec. 10, 2013

(86) PCT No.: PCT/JP2013/083138
§ 371 (c)(1),
(2) Date: Jan. 13, 2016

(87) PCT Pub. No.: WO2015/019514
PCT Pub. Date: Feb. 12, 2015

(65) Prior Publication Data
US 2016/0164070 A1   Jun. 9, 2016

(30) Foreign Application Priority Data

Aug. 9, 2013 (JP) ................................ 2013-166462

(51) Int. Cl.
*H01M 4/13* (2010.01)
*H01M 4/04* (2006.01)
(Continued)

(52) U.S. Cl.
CPC .......... *H01M 4/0404* (2013.01); *H01M 4/13* (2013.01); *H01M 4/139* (2013.01); *H01M 4/64* (2013.01);
(Continued)

(58) Field of Classification Search
CPC ............ H01M 10/04; H01M 10/0431; H01M 10/0409; H01M 4/06; H01M 2/26;
(Continued)

(56) References Cited

U.S. PATENT DOCUMENTS

2003/0099880 A1   5/2003   Park et al.
2006/0006063 A1   1/2006   Tanaka et al.
(Continued)

FOREIGN PATENT DOCUMENTS

CN         1741215 A       3/2006
CN       101212039 A       7/2008
(Continued)

OTHER PUBLICATIONS

Communication dated Feb. 9, 2017 from the European Patent Office in counterpart Application No. 13891018.7.
(Continued)

*Primary Examiner* — Cynthia K Walls
(74) *Attorney, Agent, or Firm* — Sughrue Mion, PLLC

(57) ABSTRACT

An object of the present invention is to provide a high-quality secondary battery having high electric characteristics and high reliability, the secondary battery preventing a shortcut between a positive electrode and a negative electrode by means of an insulating material and preventing or reducing an increase in volume and deformation of a battery electrode assembly, and a method for manufacturing the same. Secondary battery 100 according to the present invention includes a battery electrode assembly including positive electrode 1 and negative electrode 6 alternately stacked via separator 20. Positive electrode 1 and negative electrode 2 each includes current collector 3 or 8 and active material 2 or 7 applied to current collector 3 or 8. Active material 2A positioned on one surface of positive electrode 1 of current collector 3 includes flat part $2A_1$ and small-thickness part (Continued)

(thin-layer part) $2A_3$ positioned on the end portion side relative to flat part $2A_1$, the small-thickness part $2A_3$ having a thickness that is smaller than that of flat part $2A_1$. A part of active material 2B positioned on another surface of current collector 3 of positive electrode 1, the part facing thin-layer part $2A_3$ of active material 2A positioned on the one surface via current collector 3 is a flat part having a constant thickness.

8 Claims, 10 Drawing Sheets

(51) Int. Cl.
*H01M 4/139* (2010.01)
*H01M 4/64* (2006.01)
*H01M 10/0585* (2010.01)
*H01M 10/0525* (2010.01)

(52) U.S. Cl.
CPC .... *H01M 10/0585* (2013.01); *H01M 10/0525* (2013.01); *H01M 2220/30* (2013.01)

(58) Field of Classification Search
CPC .. H01M 10/0525; H01M 2/1673; H01M 4/13; H01M 10/052; H01M 10/0585; H01M 2004/028; H01M 2220/30; H01M 4/64; H01M 2220/20
See application file for complete search history.

(56) References Cited

U.S. PATENT DOCUMENTS

| | | | |
|---|---|---|---|
| 2006/0008702 A1 | 1/2006 | Cheon et al. | |
| 2009/0246612 A1* | 10/2009 | Naoi | H01M 2/162 429/144 |
| 2012/0058375 A1* | 3/2012 | Tanaka | H01M 4/13 429/94 |
| 2012/0202105 A1 | 8/2012 | Shinyashiki et al. | |

FOREIGN PATENT DOCUMENTS

| | | | |
|---|---|---|---|
| CN | 201117712 | Y | 9/2008 |
| CN | 101546844 | A | 9/2009 |
| CN | 101730952 | A | 6/2010 |
| CN | 102468475 | A | 5/2012 |
| EP | 2 966 721 | A1 | 1/2016 |
| EP | 3 012 898 | A1 | 4/2016 |
| JP | 07-249403 | A | 9/1995 |
| JP | 9-180704 | A | 7/1997 |
| JP | 10092418 | A | 4/1998 |
| JP | 2003-068279 | A | 3/2003 |
| JP | 2003-151535 | A | 5/2003 |
| JP | 2004-303622 | A | 10/2004 |
| JP | 2006024710 | A | 1/2006 |
| JP | 2006147392 | A | 6/2006 |
| JP | 2009-238487 | A | 10/2009 |
| JP | 2012-164470 | A | 8/2012 |
| JP | 2013-149521 | A | 8/2013 |
| WO | 2012/124188 | A1 | 9/2012 |

OTHER PUBLICATIONS

International Search Report for PCT/JP2013/083138 dated Mar. 25, 2014.
Communication dated Apr. 6, 2017 from the State Intellectual Property Office of the P.R.C. in counterpart Application No. 201380078839.0.
Communication dated Mar. 19, 2018, from the European Patent Office in counterpart European Application No. 13891018.7.
Communication dated Aug. 23, 2018, from the State Intellectual Property Office of People's Republic of China in counterpart Application No. 201380078839.0.

* cited by examiner

SECONDARY BATTERY AND METHOD FOR MANUFACTURING SAME

TECHNICAL FIELD

The present invention relates to a secondary battery including a positive electrode and a negative electrode laid over each other with a separator interposed therebetween, and a method for manufacturing the same.

BACKGROUND ART

Secondary batteries are becoming widely used as power supplies for vehicles and household appliances, and not only as power supplies for portable devices such as mobile phones, digital cameras and laptop computers, and among others, lithium ion secondary batteries, which have a high-energy density and are lightweight, are energy storage devices that are indispensable in daily life.

Secondary batteries are generally classified into a rolled type and a stacked type. A battery electrode assembly of a rolled type secondary battery has a structure in which a long positive electrode sheet and a long negative electrode sheet laid on each other via a separator are rolled a plurality of turns. A battery electrode assembly of a stacked type secondary battery has a structure in which positive electrode sheets and negative electrode sheets are alternately stacked with separators interposed therebetween. The positive electrode sheets and the negative electrode sheets each include a current collector including a coated portion to which active material (which may be a compound agent containing, e.g., a binder and a conductive material) has been applied and an uncoated portion to which active material has not been applied in order to allow an electrode terminal to be connected thereto.

In either a rolled type secondary battery or a stacked type secondary battery, a battery electrode assembly is enclosed inside an outer container in such a manner that: one end of a positive electrode terminal is electrically connected to an uncoated portion of a positive electrode sheet and another end of the positive electrode terminal extends to the outside of the outer container (outer case); and one end of a negative electrode terminal is electrically connected to an uncoated portion of a negative electrode sheet and another end of the negative electrode terminal extends to the outside of the outer container. Inside the outer container, in addition to the battery electrode assembly, electrolyte is enclosed. Capacities of secondary batteries have been increasing year by year, and along with this increase, heat that would be generated if a shortcut occurs also increases, causing an increase in risk, and thus, measures to ensure battery safety are becoming increasingly important.

As an example of a safety countermeasure, a technique in which insulating material is formed on a boundary part between a coated portion and an uncoated portion in order to prevent a shortcut between a positive electrode and a negative electrode is known (Patent Document 1).

RELATED ART DOCUMENT

Patent Document

Patent Document 1: JP2012-164470A

SUMMARY OF INVENTION

Problems to be Solved by the Invention

In the technique disclosed in Patent Document 1, as illustrated in FIG. 19, positive electrode 1 and negative electrode 6 are alternately stacked via separator 20, and on current collector 3 of each positive electrode 1, insulating material 40 covering boundary part 4 between a coated portion to which active material 2 has been applied and an uncoated portion to which active material 2 has not been applied is formed. In a stacked type secondary battery, insulating materials 40 are stacked at the same position in a planar view. Thus, the thickness of a part of the battery electrode assembly at the position where insulating materials 40 are disposed, becomes thicker, which results in reducing energy density per unit volume.

Also, in order to obtain stable electric characteristics and high reliability, it is preferable that the battery electrode assembly of a secondary battery be fastened via, e.g., a tape by applying pressure uniformly. However, use of insulating materials in a stacked type secondary battery in such a manner as in Patent Document 1 results in failure to uniformly fasten a battery electrode assembly due to a difference in thickness between a part in which insulating materials 40 are present and a part in which insulating materials 40 are not present, which may cause battery quality deterioration such as variability in electric characteristics and/or degradation of battery cycle properties.

Therefore, an object of the present invention is to solve the aforementioned problems and provide a high-quality secondary battery having high electric characteristics and high reliability, the secondary battery preventing a short circuit between a positive electrode and a negative electrode by means of insulating material and preventing or reducing an increase in volume and deformation of a battery electrode assembly, and a method for manufacturing the same.

Means to Solve the Problems

A secondary battery according to the present invention comprises a battery electrode assembly including a positive electrode and a negative electrode alternately stacked via a separator, and the positive electrode and the negative electrode each includes a current collector and active material applied to the current collector. The active material positioned on one surface of the current collector of the positive electrode, includes a flat part and a small-thickness part positioned on an end portion side relative to the flat part, the small-thickness part having a thickness that is smaller than that of the flat part. A part of the active material positioned on another surface of the current collector of the positive electrode, which faces the small-thickness part of the active material positioned on the one surface, across the current collector, is a flat part having a constant thickness.

Advantageous Effect of Invention

The present invention enables preventing or reducing an increase in volume of a battery electrode assembly and distortion of the battery electrode assembly that are caused by insulating material, and enables provision of a high-quality secondary battery having good energy density.

DESCRIPTION OF EXEMPLARY EMBODIMENT

An exemplary embodiment of the present invention will be described below with reference to the drawings.

[Basic Configuration of Secondary Battery]

Figure 1A:
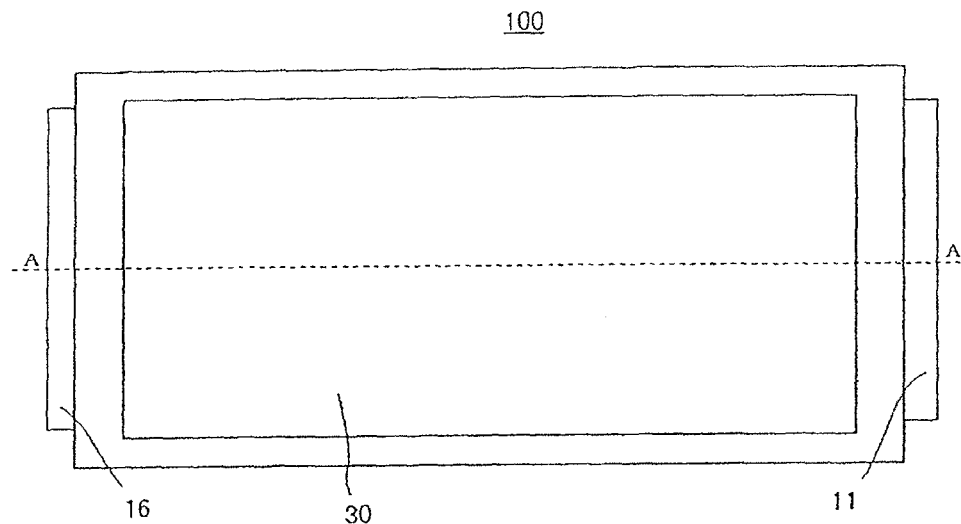
FIG. 1A is a plan view illustrating a basic structure of a stacked type secondary battery according to the present invention.
Figure 1B:
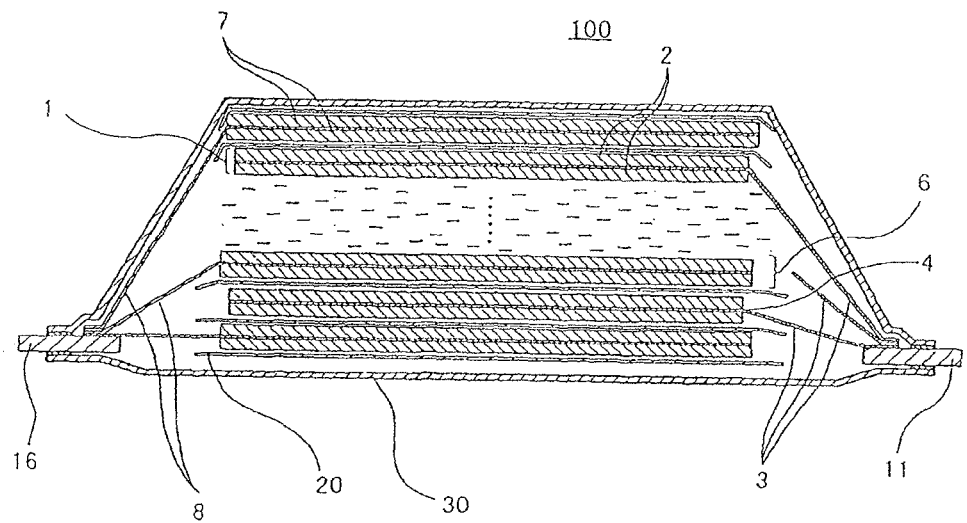
FIG. 1B is a cross-sectional view along line A-A in FIG. 1A.

FIG. 1 schematically illustrates an example of a configuration of a stacked type lithium ion secondary battery employing the present invention. FIG. 1A is a plan view as viewed from the upper side perpendicular to a principal surface (planar surface) of the secondary battery, and FIG. 1B is a cross-sectional view along line A-A in FIG. 1A.

Lithium ion secondary battery 100 according to the present invention includes an electrode stack (battery electrode assembly) formed by alternately stacking positive electrodes (positive electrode sheets) 1 and negative electrodes (negative electrode sheets) 6 via separators 20. The electrode stack is housed together with an electrolyte in an outer container consisting of flexible films 30. One end of positive electrode terminal 11 is connected to positive electrodes 1 of the electrode stack, and one end of negative electrode terminal 16 is connected to negative electrodes 6, and another end side of positive electrode terminal 11 and another end side of negative electrode terminal 16 extend to the outside of the flexible films 30. In FIG. 1B, illustration of a part of the layers (layers positioned in the intermediate part in a thickness direction) included in the electrode stack is omitted but the electrolyte is illustrated.

Each positive electrode 1 includes positive-electrode current collector 3 and positive-electrode active materials 2 applied to positive-electrode current collector 3, and on each of a front surface and a back surface of positive-electrode current collector 3, a coated portion to which positive-electrode active material 2 has been applied and an uncoated portion to which positive-electrode active material 2 has not been applied are positioned side by side along a longitudinal direction. Likewise, each negative electrode 6 includes negative-electrode current collector 8 and negative-electrode active materials 7 applied to negative-electrode current collector 8, and on each of a front surface and a back surface of negative-electrode current collector 8, a coated portion and an uncoated portion are positioned side by side along the longitudinal direction. A planar position of boundary part 4 between the coated portion and the uncoated portion of each positive electrode 1 and a planar position of boundary part 4 between the coated portion and the uncoated portion of each negative electrode 6 may be the same or different (not aligned in planar view) between the front surface and the back surface of the relevant current collector.

The uncoated portion of each of positive electrodes 1 and negative electrodes 6 is used as a tab for connection with an electrode terminal (positive electrode terminal 11 or negative electrode terminal 16). The positive electrode tabs connected to respective positive electrodes 1 are bundled on positive electrode terminal 11 and are mutually connected together with positive electrode terminal 11 by means of, e.g. ultrasonic welding. The negative electrode tabs connected to respective negative electrodes 6 are bundled on negative electrode terminal 16 and are mutually connected together with negative electrode terminal 16 by means of, e.g., ultrasonic welding. On that basis, the other end portion of positive electrode terminal 11 and the other end portion of negative electrode terminal 16 extend to the outside of the outer container.

Figure 2:
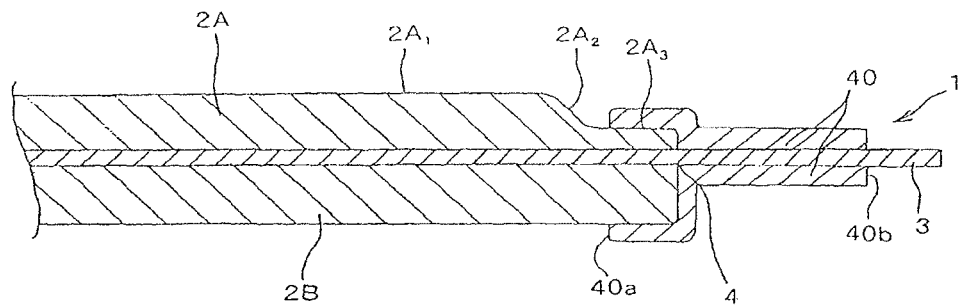
FIG. 2 is an enlarged cross-sectional view illustrating a positive electrode in an exemplary embodiment of a secondary battery of the present invention.

As illustrated in FIG. 2, insulating material 40 for preventing the occurrence of a short circuit in negative electrode terminal 16 is formed so as to cover boundary part 4 between the coated portion and the uncoated portion of each positive electrode 1. Insulating material 40 is preferably formed to straddle both the positive electrode tab and positive-electrode active material 2 so as to cover boundary part 4. Formation of insulating material 40 will be described later.

Outer dimensions of the coated portion (negative-electrode active material 7) of each negative electrode 6 are larger than those of the coated portion (positive-electrode active material 2) of each positive electrode 1 and are smaller than or equal to those of each separator 20.

In the battery illustrated in FIGS. 1A and 1B, examples of positive-electrode active material 2 include layered oxide materials such as $LiCoO_2$, $LiNiO_2$, $LiNi_{(1-x)}CoO_2$, $LiNi_x(CoAl)_{(1-x)}O_2$, $Li_2MO_3$—$LiMO_2$, $LiNi_{1/3}Co_{1/3}Mn_{1/3}O_2$, spinel materials such as $LiMn_2O_4$, $LiMn_{1.5}Ni_{0.5}O_4$, $LiMn_{(2-x)}M_xO_4$, olivine materials such as $LiMPO_4$, olivine fluoride materials such as $Li_2MPO_4F$ and $Li_2MSiO_4F$, and vanadium oxide materials such as $V_2O_5$. One of the above materials or a mixture of two or more selected from among the above materials may be used as positive-electrode active material 2.

As negative-electrode active material 7, carbon materials such as graphite, amorphous carbon, diamond-like carbon, fullerene, carbon nanotube, carbon nanohorn, lithium metal materials, silicon- or tin-based alloy materials, oxide-based materials such as $Nb_2O_5$ and $TiO_2$, or a composite of them may be used.

A binding agent and/or a conductive assistant may arbitrarily be added to positive-electrode active material 2 and negative-electrode active material 7. As the conductive assistant, carbon black or carbon fiber or graphite or the like can be used and the combination of two or more of the above materials can be used. As the binding agent, polyvinylidene fluoride, polytetrafluoroethylene, carboxymethyl cellulose, modified acrylonitrile rubber particles or the like may be used.

As positive-electrode current collector 3, aluminum, stainless steel, nickel, titanium or an alloy containing any of these materials can be used, and in particular, aluminum is preferable. As negative-electrode current collector 8, copper, stainless steel, nickel, titanium or an alloy containing any of these materials can be used.

As the electrolyte, one organic solvent selected from among cyclic carbonates such as ethylene carbonate, propylene carbonate, vinylene carbonate and butylene carbonate, chain carbonates such as ethyl methyl carbonate (EMC), diethyl carbonate (DEC), dimethyl carbonate (DMC) and dipropyl carbonate (DPC), aliphatic carboxylic acid esters, γ-lactones such as γ-butyrolactone, chain ethers, and cyclic ethers may be used and the mixture of two or more of the above materials may be used. Furthermore, a lithium salt can be dissolved in the organic solvent(s).

Separator 20 is formed mainly of a porous membrane, woven fabric, nonwoven fabric that are made of resin. As the resin component in separator 20, polyolefin-based resin such as polypropylene or polyethylene, polyester resin, acrylic resin, styrene resin, nylon resin or the like can be used, for example. A polyolefin-based microporous membrane is particularly preferable because the polyolefin-based microporous membrane has excellent ion-permeating properties and excellent performance characteristics for physically separating a positive electrode and a negative electrode. A layer containing inorganic particles may be formed in separator 20 as needed. Examples of the inorganic particles include insulating oxide, silicate, nitride, and carbide. In particular, the inorganic particles preferably contain $TiO_2$ or $Al_2O_3$.

As the outer container, a case made of flexible film 30 or a can case can be used. From the point of view of battery weight reduction, using flexible film 30 is preferable. As flexible film 30, a film in which resin layers are provided on both the front and rear surfaces of a metal layer as a base material can be used. As the metal layer, a layer having barrier properties which may be properties for preventing leakage of an electrolyte and infiltration of moisture from the outside can be selected, and aluminum, stainless steel or the like can be used. A thermally-fusible resin layer such as modified polyolefin is provided on at least one surface of the metal layer. The thermally-fusible resin layers of flexible film 30 are opposite to each other and are thermally fused to each other in the part that surrounds the space where the laminated electrode assembly is stored, thereby the outer container is formed. A resin layer such as a nylon film and a polyester film may be provided on the surface of the outer container opposite to the surface on which the thermally-fusible resin layer is formed.

As positive electrode terminal 11, a terminal formed of aluminum or aluminum alloy can be used. As negative electrode terminal 16, a terminal formed of copper, copper alloy, or nickel-plated copper or copper alloy can be used. Each of the other ends of terminals 11 and 16 extends to the outside of the outer container. Thermally-fusible resin can be provided in advance at each of the positions of terminals 11 and 16 corresponding to the thermal-welded portions of the outer peripheral of the outer container.

Insulating material 40 that is formed to cover boundary part 4a between a coated portion and an uncoated portion of positive electrode active material 2 can be made of polyimide, glass fiber, polyester, polypropylene, or a material including these. Insulating material 40 may be formed by applying heat to a tape-like resin member to weld the resin member to boundary part 4a or by applying a gel resin to boundary part 4a and drying the resin.

[Detailed Configuration of Electrodes]

Figure 3:
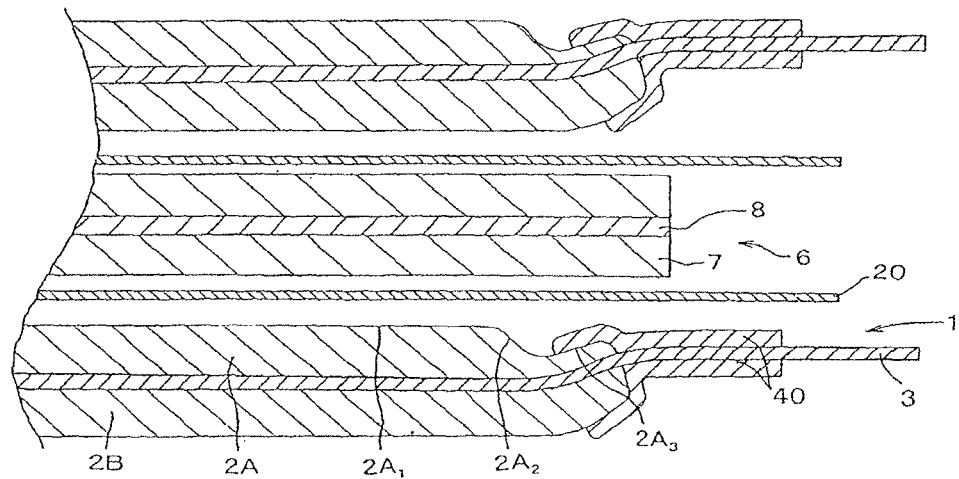
FIG. 3 is an enlarged cross-sectional view illustrating a major part of an exemplary embodiment of a secondary battery according to the present invention.

FIG. 2 is a schematic cross-sectional view for describing an exemplary embodiment of lithium ion secondary battery 100 according to the present invention, and schematically illustrates only a part of an electrode stack in an enlarged manner. Here, a part around an end portion on the positive electrode tab side of positive-electrode active material 2 is illustrated. FIG. 3 illustrates an electrode stack including positive electrodes 1.

As illustrated in FIGS. 2 and 3, positive-electrode active material 2 is formed on each of opposite surfaces of each positive-electrode current collector 3, and although not illustrated in FIGS. 1A and 1B, insulating material 40 is provided to straddle a coated portion to which positive-electrode active material 2 has been applied and an uncoated portion (positive electrode tab) to which positive-electrode active material 2 has not been applied. First positive-electrode active material layer 2A formed on one surface (upper surface in FIG. 2) of each positive-electrode current collector 3 includes flat part $2A_1$, inclined part $2A_2$ and thin-layer part $2A_3$. Thin-layer part $2A_3$ is a part positioned on the end portion side (positive electrode tab side) relative to the flat part $2A_1$, the part having a thickness that is smaller than that of flat part $2A_1$. Inclined part $2A_2$ is a part whose thickness continuously decreases so as to smoothly connect thick flat part $2A_1$ and thin-layer part $2A_3$. However, instead of inclined part $2A_2$, a stepped part whose thickness intermittently decreases may be provided. On the other hand, second positive-electrode active material layer 2B formed on another surface (lower surface in FIG. 2) of each positive-electrode current collector 3 includes only a flat part. One end portion 40a of insulating material 40 is positioned on thin-layer part $2A_3$ of first positive-electrode active material layer 2A, and another end portion 40b is positioned on the uncoated portion, that is, the part of positive-electrode current collector 3 on which positive-electrode active material 2 is not formed (positive electrode tab). As illustrated in FIG. 3, in each negative electrode 6, also, negative-electrode active material 7 is applied to each of a front surface and a back surface of each negative-electrode current collector 8; however, negative-electrode active material 7 includes only a flat part, and includes neither an inclined part nor a thin-layer part.

Figure 4:
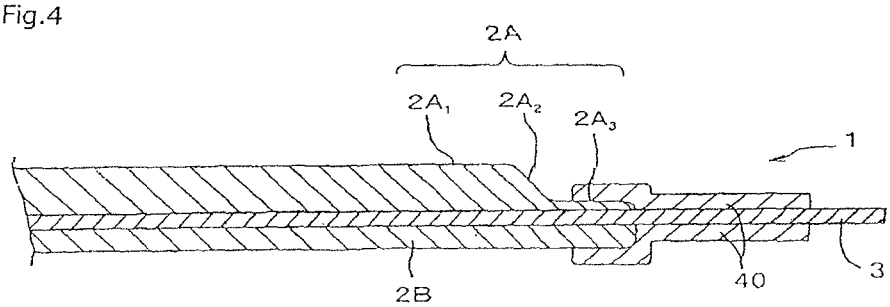
FIG. 4 is an enlarged cross-sectional view illustrating a variation of a positive electrode in an exemplary embodiment of a secondary battery of the present invention.

The difference in thickness between flat part $2A_1$ and thin-layer part $2A_3$ of first positive-electrode active material 2A is preferably larger than the thickness of insulating material 40. Also, end portion 40a of insulating material 40 positioned on second positive-electrode active material layer 2B is preferably positioned so as to face thin-layer part $2A_3$ of first positive-electrode active material layer 2A. Such disposition enables preventing or reducing an increase in thickness caused by insulating materials 40 positioned on the opposite surfaces of each positive-electrode current collector 3. In other words, adjustment (reduction) of the thickness of an outer edge portion of each first positive-electrode active material layer 2A (coated portion) enables preventing or reducing an increase in thickness in the part of the electrode stack in which insulating materials 40 are positioned, thereby preventing characteristics of the battery from being affected by the thickness increase. In particular, if the difference in thickness between thin-layer part $2A_3$ and flat part $2A_1$ of each first positive-electrode active material layer 2A is no less than twice the thickness of one insulating material 40, such a degree of difference is effective because an increase in thickness caused by two insulating materials 40 can be absorbed by the thickness reduction provided by thin-layer part $2A_3$ of first positive-electrode active material layer 2A. Here, since it is not necessary that positive-electrode active material layers 2A and 2B on opposite surface of positive-electrode current collector 3 have the same thickness, and thus, even where the thickness of one positive-electrode active material layer (second positive-electrode active material layer 2B) is less than twice the thickness of insulating material 40, as illustrated in FIG. 4, if only flat part $2A_1$ of another positive-electrode active material layer (first positive-electrode active material layer 2A) is made thicker in order that a difference in thickness between flat part $2A_1$ and thin-layer part $2A_3$ may be no less than twice the thickness of insulating material 40, the thickness increase that is caused by two insulating materials 40 can be absorbed by reduction in the thickness provided by thin-layer part $2A_3$, and thus a sufficient effect can be provided.

At an end portion of each negative electrode 6 on the side that is the same as the end portion of each first positive-electrode active material layer 2A in which inclined part $2A_2$ and thin-layer part $2A_3$ are provided as described above, negative-electrode current collector 8 and flat negative-electrode active materials 7 formed on opposite surfaces thereof are cut and terminated. In other words, at the end portion of each negative-electrode active material 7 on the side that is the same as the side of each first positive-electrode active material layer 2A in which inclined part $2A_2$ and thin-layer part $2A_3$ are provided, neither an inclined part, nor a stepped part nor a thin-layer part is provided. The end portion is located at a position facing relevant insulating material 40 across relevant separator 20.

In FIG. 3, for ease of viewing, positive electrodes 1, negative electrode 6 and separators 20 are illustrated so as not to be in contact with one another; however, in reality, positive electrodes 1, negative electrode 6 and separators 20 are stacked in close contact with one another. In the configuration illustrated in FIG. 3, as described above, the difference in thickness between inclined part $2A_1$ and thin-layer part $2A_3$ of each first positive-electrode active material layer 2A is more than twice the thickness of each insulating material 40, and thus, when positive electrodes 1, negative electrodes 6 and separators 20 are brought into close contact with one another, positive electrodes 1 are curved at respective positions of thin-layer parts $2A_3$, enabling preventing or reducing a partial increase in the thickness of the electrode stack caused by insulating materials 40. As described above, FIG. 3 illustrates a configuration in which positive electrodes 1 are curved; however, a configuration in which only negative electrodes 6 are curved or a configuration in which both positive electrodes 1 and negative electrodes 6 are curved can be employed.

Here, it is not necessary that flat part $2A_1$ and thin-layer part $2A_3$ be disposed in parallel to each other on each positive-electrode current collector 3, and an edge of boundary part 4 between a coated portion and an uncoated portion of each positive electrode 1 and an edge of an end portion of each negative electrode 6 may each have a round curve shape, rather than a linear shape perpendicular to a direction in which relevant current collector 3 or 8 extends. It should be understood that each of positive-electrode active materials 2 and negative-electrode active materials 7 may include e.g., an unavoidable inclination, irregularities or roundness of respective layers due to, for example, manufacturing variations and/or layer formation capability.

Each first positive-electrode active material layer 2A may include a stepped part whose thickness decreases in a stepwise fashion, instead of inclined part $2A_2$ whose thickness gently decreases as illustrated in FIG. 3. Alternatively, each first positive-electrode active material layer 2A may include both inclined part $2A_2$ and the stepped part. Also, it is possible that: thin-layer part $2A_3$ is not provided independently from inclined part $2A_2$ and the stepped part; and a part of inclined part $2A_2$ or the stepped part which has a decreased thickness, faces relevant insulating material 40, whereby the thickness increase caused by insulating material 40 is absorbed. In such a case, the part of the inclined part $2A_2$ or the stepped part which faces insulating material 40, can be regarded as acting as thin-layer part $2A_3$. Inclined parts $2A_2$ and thin-layer parts $2A_3$ illustrated in FIGS. 2 to 4 and the non-illustrated stepped parts each have a low density compared to flat parts $2A_1$.

In the configuration illustrated in FIG. 3, inclined part $2A_2$ and thin-layer part $2A_3$ are formed only in each first positive-electrode active material layer 2A, rather than an inclined part or a stepped part and a thin-layer part being provided in each of both positive-electrode active material layers 2A and 2B, mainly because the shape of thin-layer part $2A_3$ can be formed with good precision and because the electrode capacity loss is small.

For example, if an inclined part, a stepped part and/or a thin-layer part are provided in each of both first positive-electrode active material layers 2A and second positive-electrode active materials 2B, and if insulating material 40 is disposed so as to face the inclined part, the stepped part and/or the thin-layer part enables preventing or reducing a partial increase in thickness caused by insulating materials. However, a thickness reduction causes a reduction in the amount of active materials, which results in a decrease in battery capacity. Also, the inventors' careful studies revealed that provision of thin-layer part $2A_3$ in each of positive-electrode active material layers 2A and 2B may make it impossible for thin-layer part $2A_3$ to have a sufficiently-small thickness. In such a case, the electrodes could not be used as products and would be discarded as defective products, which results in deterioration in productivity. Also, provision of a thin-layer part, an inclined part and/or a stepped part in each negative-electrode active material 8 of each negative electrode 6 facing relevant positive electrode 1 across relevant separator 20 has the effect of preventing or reducing a partial thickness increase caused by insulating materials 40; however, in such a case, the amount of negative-electrode active materials 8 decreases, also unfavorably resulting in a battery capacity decrease.

For a more detailed evaluation, it was found that a failure to form a thin-layer part, an inclined part and/or a stepped part of positive-electrode active material 2 with good precision and unstable formation of the thin-layer part, the inclined part and/or the stepped part are partly attributable to a tendency of such parts being formed so as to lean toward either first positive-electrode active material 2A or second positive-electrode active material 2B. This will be described using the reference example illustrated in FIGS. 5A and 5B.

Figure 5A:
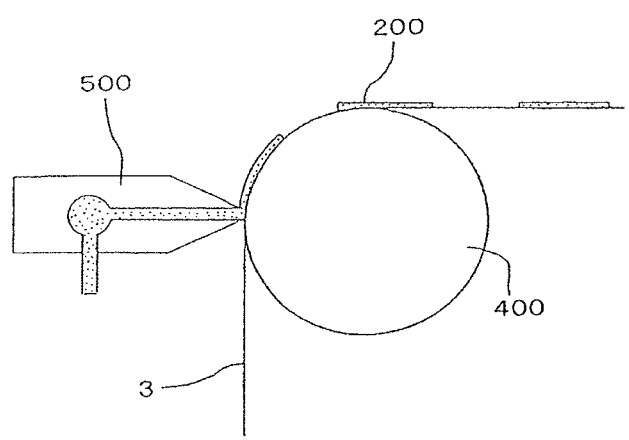
FIG. 5A is a schematic diagram illustrating an example of an electrode coating apparatus.

FIG. 5A is a schematic diagram indicating a coating part of a die coater, which is a kind of apparatuses for coating electrodes. The die coater applies slurry 200 to a current collector between die head 500 and back roll 400. Slurry 200 containing an active material is discharged from discharge port 501 of die head 500 toward the current collector transported on the outer peripheral surface of back roll 400. The thickness of slurry 200 on the current collector is controlled by adjusting, e.g., a space between the current collector and discharge port 501, the discharge amount and/or the application speed according to, e.g., a viscosity of slurry 200. In the example illustrated in FIGS. 5A and 5B, slurry 200 containing positive-electrode active material 2 is intermittently applied to positive-electrode current collector 3. It should be understood that slurry 200 can continuously be applied to positive-electrode current collector 3.

Figure 5B:
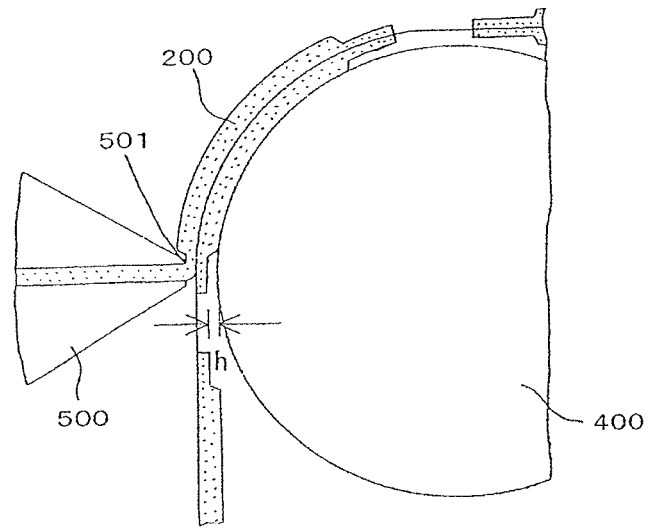
FIG. 5B is a schematic diagram illustrating a reference example of an electrode manufacturing method.

FIG. 5B illustrates a state in which after application of first positive-electrode active material layer 2A to one surface of positive-electrode current collector 3 and after drying of first positive-electrode active material layer 2A, second positive-electrode active material layer 2B is applied to another surface of positive-electrode current collector 3. Each of first positive-electrode active material layer 2A and second positive-electrode active material layer 2B is intermittently formed, and an inclined part and a thin-layer part are formed at each opposite end (an application start end and an application termination end) of each coated portion. When slurry 200 is discharged from discharge port 501 of die head 500 in order to form second positive-electrode active material layer 2B on the surface of positive-electrode current collector 3 on the side opposite to a surface on which first positive-electrode active material layer 2A has already been formed, a gap is generated between the inclined part and the thin-layer part of each first positive-electrode active material 2A and back roll 400. Slurry 200 is pressurized in die head 500, and upon discharge of slurry 200, positive-electrode current collector 3 is pushed in a direction in which gap h is eliminated, that is, toward the back roll 400 side, whereby the space between the discharge port 501 and positive-electrode current collector 3 is increased. As described above, it was found that if an active material including an inclined part and a thin-layer part is formed on one surface and then an active material is formed on another surface, the space between discharge port 501 and the current collector is not stable and an active material that is subsequently formed tends to have an unstable thickness and inclination.

Figure 6:
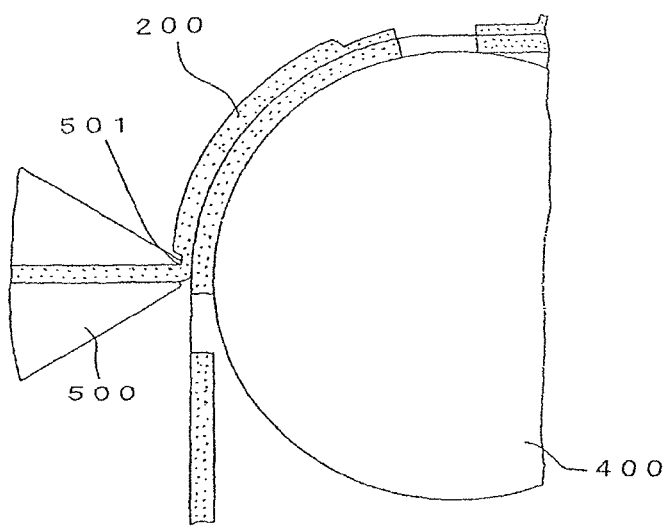
FIG. 6 is a schematic diagram illustrating an example of an electrode manufacturing method according to the present invention.

Therefore, in the present invention, as illustrated in FIG. 6, after flat second positive-electrode active material layer 2B, that does not include a thin-layer part, an inclined part, and a stepped part are formed on positive-electrode current collector 3; first positive-electrode active material layer 2A, that includes thin-layer part $2A_3$ and inclined part $2A_2$ are formed on a surface opposite to the surface on which positive-electrode active material layer 2B has been formed. Then, the part of positive-electrode current collector 3, to which first positive-electrode active material layer 2A will be subsequently applied, is a part on the opposite side of a part in which flat second positive-electrode active material layer 2B comes into close contact with back roll 400 with no gap therebetween. Since no gap is generated between second positive-electrode active material 2B and back roll 400, when first positive-electrode active material 2A is formed on positive-electrode current collector 3, the space between the discharge port 501 and positive-electrode current collector 3 is extremely stable, enabling formation of inclined part $2A_2$ and thin-layer part $2A_3$ with very good precision. Therefore, the difference in thickness between flat part $2A_1$ and thin-layer part $2A_3$ of first positive-electrode active material layer 2A can be made to be no less than twice the thickness of insulating material 40 with good precision. Even if the thickness of positive-electrode active material 2 is so small such that a thin-layer part having a thickness decreased by no less than twice the thickness of the insulating material cannot be formed and such that a thickness increase caused by insulating materials 40 cannot completely be absorbed by first positive-electrode active material layer 2A alone, the thickness of first positive-electrode active material 2A can be controlled with good precision, enabling preventing or reducing a partial increase in the thickness of the electrode stack by reducing a thickness of either or both of the negative-electrode active materials to the minimum necessary at respective positions facing the insulating materials.

As described above, provision of a thin-layer part, an inclined part and/or a stepped part in the active material provided on one surface of a current collector effectively prevents or reduces a partial increase in the thickness at a position where insulating materials are provided, and in addition, providing neither a thin-layer part, nor an inclined part, nor a stepped part in the active material provided on another surface of the current collector enables productivity enhancement.

[Electrode Manufacturing Method]

Figure 7:
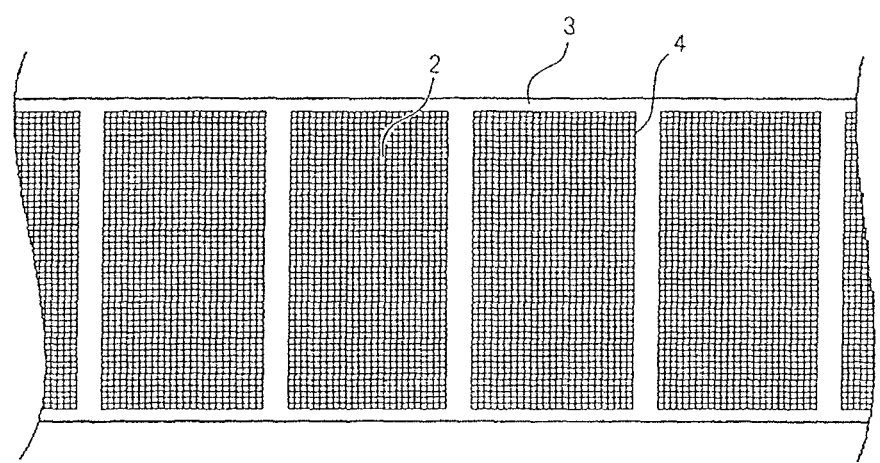
FIG. 7 is a plan view illustrating a positive electrode forming step in a secondary battery manufacturing method according to the present invention.
Figure 8:
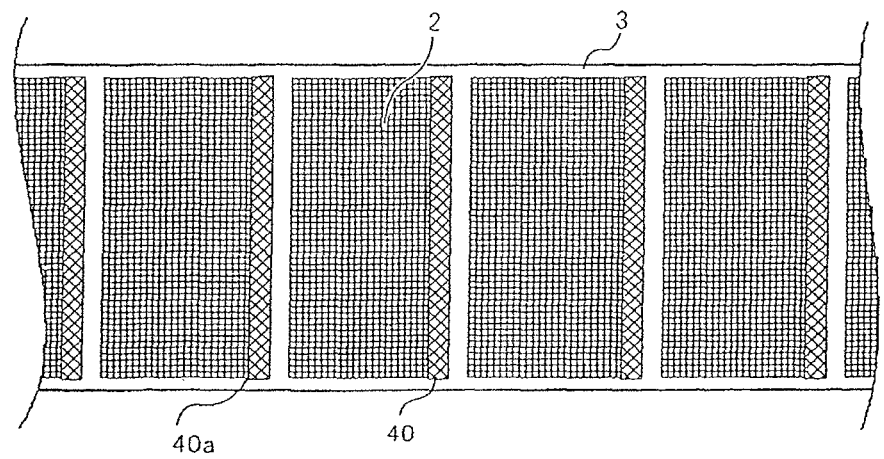
FIG. 8 is a plan view illustrating a step following FIG. 7 in the secondary battery manufacturing method according to the present invention.
Figure 19:
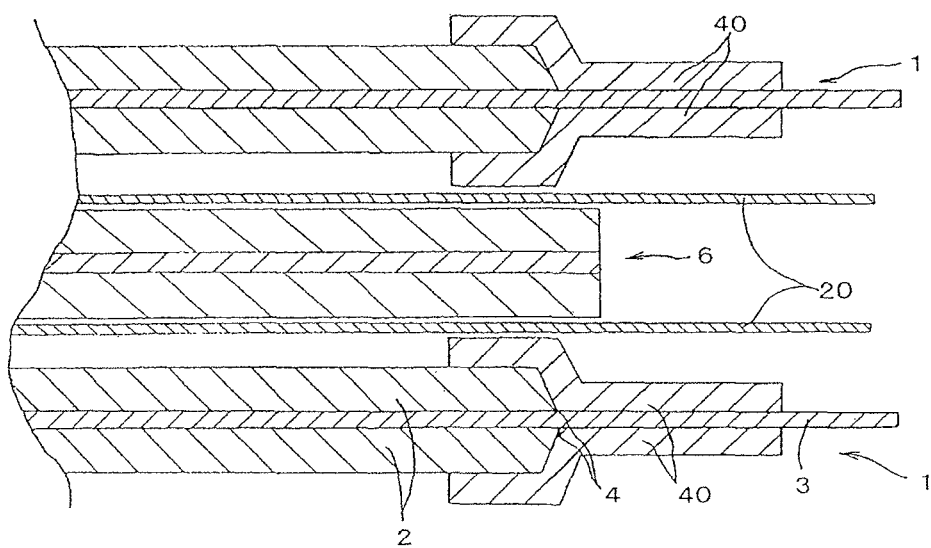
FIG. 19 is an enlarged view illustrating a major part of a stacked type secondary battery according to a related art.

First, as described above, in the step illustrated in FIG. 6, positive-electrode active material 2 is intermittently applied to each of the opposite surfaces of long band-like positive-electrode current collector 3 for manufacturing a plurality of positive electrodes (positive electrode sheets) 1. In FIG. 7, a surface on the first positive-electrode active material layer 2A side of positive-electrode current collector 3 with positive-electrode active material 2 applied to each of the opposite surfaces thereof is illustrated. Although not clearly illustrated in FIG. 7, each first positive-electrode active material layer 2A includes inclined part $2A_2$ and thin-layer part $2A_3$ in the vicinity of boundary part 4, which serves as a positive electrode tab. Then, as illustrated in FIG. 8, insulating material 40 is formed so as to cover boundary part 4. As illustrated in FIGS. 2 and 3, one end portion 40a of insulating material 40 is positioned on thin-layer part $2A_3$, and another end portion 40b of insulating material 40 is positioned on an uncoated portion. If the thickness of insulating material 40 is too small, a sufficient insulating property cannot be ensured and thus the thickness is preferably no less than 10 μm. Also, if the thickness of the insulating material 40 is excessively large, the effect of preventing or reducing an increase in the thickness of the electrode stack, which is provided by the present invention, cannot be sufficiently realized, and thus, insulating material 40 is preferably smaller in thickness than the flat part of positive-electrode active material 2. The thickness of insulating material 40 is preferably no more than 90% of the thickness of the flat part of positive-electrode active material 2, more preferably no more than 60% of the thickness of flat part 2b. Although the end portion of each coated portion (positive-electrode active material 2) at boundary part 4 between the coated portion and the relevant uncoated portion may rise substantially perpendicularly to relevant positive-electrode current collector 3 as illustrated in FIGS. 2 to 4, the end portion may be slightly inclined as illustrated in FIG. 19. Also, in each negative electrode 6, the end portion of each coated portion (negative-electrode active material 7) may be slightly inclined or rise substantially perpendicular to relevant negative-electrode current collector 8.

Figure 9A:
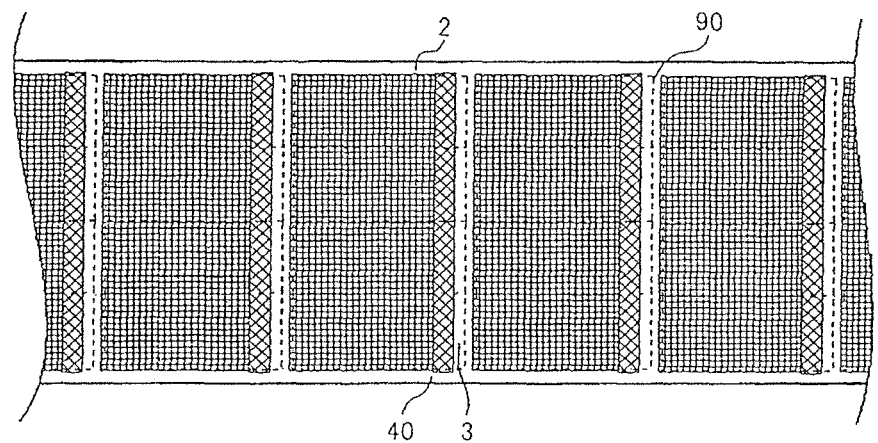
FIG. 9A is a plan view illustrating a step following FIG. 8 in the secondary battery manufacturing method according to the present invention.
Figure 9B:
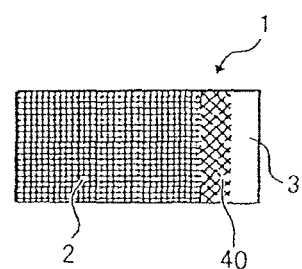
FIG. 9B is a plan view illustrating a positive electrode formed as a result of cutting in the step illustrated in FIG. 9A.

Subsequently, in order to obtain positive electrodes 1 used for individual stacked type batteries, positive-electrode current collector 3 is cut along each cutting line 90 indicated by a dashed line in FIG. 9A to obtain positive electrodes 1 of a desired size, one of which is illustrated in FIG. 9B. The cutting lines 90 are imaginary lines and thus not actually formed.

Figure 10:
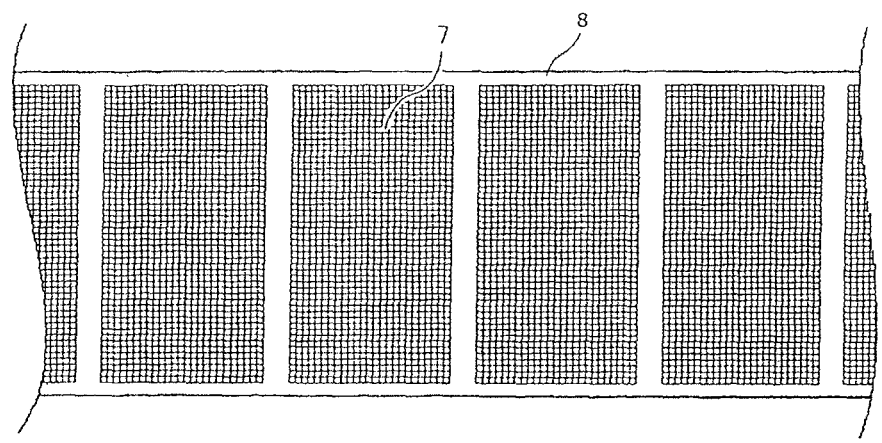
FIG. 10 is a plan view illustrating a negative electrode forming step in the secondary battery manufacturing method according to the present invention.

Meanwhile, with a method that is similar to the step illustrated in FIG. 6, negative-electrode active material 7 is intermittently applied to each of the opposite surfaces of large negative-electrode current collector 8, which is provided for manufacturing a plurality of negative electrodes (negative electrode sheets) 6. In FIG. 10, negative-electrode current collector 8 with negative-electrode active material 7 applied on each of the opposite surfaces thereof is illustrated. If the difference in thickness between flat part $2A_1$ and thin-layer part $2A_3$ of each first positive-electrode active material layer 2A is no less than twice the thickness of each insulating material 40 as illustrated in FIGS. 2 and 3, negative-electrode active material 7 may include a flat part alone in which neither an inclined part, nor a thin-layer part, nor a stepped part are present.

Figure 11A:
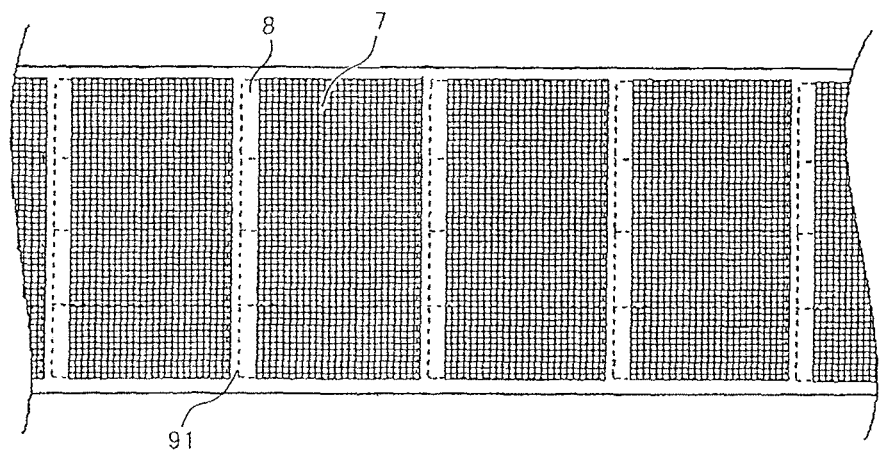
FIG. 11A is a plan view illustrating a step following FIG. 10 in the secondary battery manufacturing method according to the present invention.
Figure 11B:
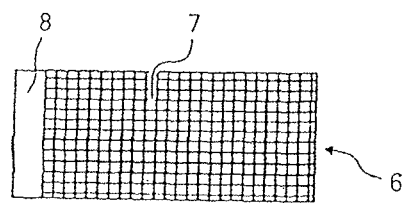
FIG. 11B is a plan view illustrating a negative electrode formed as a result of cutting in the step illustrated in FIG. 11A.

Subsequently, in order to obtain negative electrodes 6 to be used for individual stacked type batteries, negative-electrode current collector 8 is divided by cutting negative-electrode current collector 8 along each cutting line 91 indicated by a dashed line in FIG. 11A to obtain negative electrodes 6 having a desired size, one of which is illustrated in FIG. 11B. Cutting lines 91 are imaginary lines and thus are not actually formed.

Positive electrodes 1 illustrated in FIG. 9B and negative electrodes 6 illustrated in FIG. 11B formed as described above are alternately stacked via separators 20, and positive electrode terminal 11 and negative electrode terminal 16 are connected to the stacked electrodes, whereby the electrode stack illustrated in FIG. 3 is formed. The electrode stack is housed and sealed together with electrolyte in an outer container including flexible films 30, whereby secondary battery 100 illustrated in FIGS. 1A and 1B is formed. In secondary battery 100 according to the present invention, which has been formed as described above, one end portion 40a of each insulating material 40 is positioned on thin-layer part $2A_3$ of relevant first positive-electrode active material layer 2A.

According to secondary battery 100, the amount of thickness increase caused by each insulating material 40 formed so as to cover boundary part 4 between the coated portions and the uncoated portion of relevant positive electrode 1 is absorbed (cancelled out) by the thickness reduction provided by thin-layer part $2A_3$ and inclined part $2A_2$ of relevant first positive-electrode active material layer 2A, preventing or reducing a partial increase in the thickness of the electrode stack, and thus, the electrode stack can be uniformly fastened and held in place, thereby preventing or reducing a deterioration in product quality as regards, for example, variability in the electric characteristics and battery cycle degradation.

In the example illustrated in FIG. 11B, the coated portion at each of the opposite surfaces of each negative electrode 6 is cut and terminated at a position facing the uncoated portion (positive electrode tab) of relevant positive electrode 1, and as illustrated in FIG. 3, at a position facing the uncoated portion of each positive electrode 1, negative-electrode active material 7 exists on the front and back of negative-electrode current collector 8 with no uncoated portion provided. However, each negative electrode 6 may also be configured in such a manner that an uncoated portion is present at a position in negative electrode 6, the position facing the uncoated portion of positive electrode 1. As illustrated in FIG. 11B, at an end portion of each negative electrode 6, the end portion not facing the uncoated portion of relevant positive electrode 1, an uncoated portion, which serves as a negative electrode tab, is provided. If insulating material (not illustrated) is provided on a boundary part between the coated portion and the uncoated portion of each negative electrode 6, as in the case in which a thickness increase caused by insulating material 40 is cancelled out by means of each positive electrode 1, a thin-layer part, an inclined part and/or a stepped part having a small thickness may be provided in each negative-electrode active material or in each positive-electrode active material, and insulating material may be disposed at a position facing the thin-layer part, the inclined part and/or the stepped part.

Figure 12:
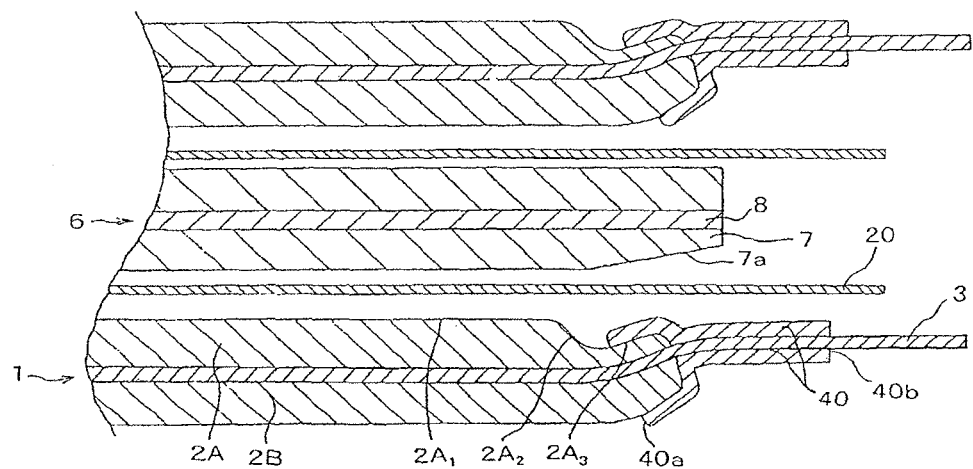
FIG. 12 is an enlarged cross-sectional view illustrating a major part of another exemplary embodiment of a secondary battery according to the present invention.

As illustrated in FIG. 12, an inclined part 7a can be provided in at least one of negative-electrode active materials 7 in each negative electrode 6 to further reduce the possibility of battery distortion due to insulating materials 40 provided on positive electrodes 1. Each insulating material 40 with one end portion 40a positioned on thin-layer part $2A_3$ of relevant first positive-electrode active material layer 2A is preferably formed in such a manner that the total thickness of two insulating materials 40 is no larger than the difference in thickness between flat part $2A_1$ and thin-layer part $2A_3$ of each first positive-electrode active material layer 2A. However, manufacturing variations may prevent the difference in thickness between flat part $2A_1$ and thin-layer part $2A_3$ of each first positive-electrode active material layer 2A from becoming the desired size. Even if such manufacturing variations occur, the presence of inclined part 7a of each negative-electrode active material 7 enables the thickness increase caused by manufacturing variations of positive electrodes 1 to be absorbed (cancelled out). In FIG. 12, a configuration in which inclined part 7a of each negative-electrode active material 7 is positioned facing insulating material 40 on relevant first positive-electrode active material layer 2A, which includes inclined part $2A_1$ and thin-layer part $2A_3$, across relevant separator 20 is illustrated as an example. However, inclined part 7a may be disposed so as to face insulating material 40 on relevant second positive-electrode active material layer 2B, which has neither an inclined part nor a thin-layer part, across relevant separator 20.

Unless otherwise specified, each of thicknesses, distances, etc., of the respective members in the present invention means the average value of values measured at three or more arbitrary positions.

EXAMPLES

Example 1

According to the manufacturing method described with reference to FIGS. 6 to 12, a lithium ion secondary battery was manufactured.

First, a mixed active material of $LiMn_2O_4$ and $LiNi_{0.8}Co_{0.1}Al_{0.1}O_2$ was used as positive-electrode active material, carbon black was used as a conductive agent, and PVdF was used as binder, and slurry 200 in which a compound agent consisting of these materials is dispersed in an organic solvent was prepared. This slurry 200 was intermittently applied to positive-electrode current collector 3 having a thickness of 20 μm and mainly consisting of aluminum and then dried, whereby second positive-electrode active material layers 2B having a thickness of 80 μm was formed. As a result of the intermittent application of positive-electrode active material 2, coated portions coated with positive-electrode active material 2 and uncoated portions not coated with positive-electrode active material 2 are alternately present along a longitudinal direction of positive-electrode current collector 2. Next, as illustrated in FIGS. 6 and 7, positive-electrode active material 2 was intermittently applied to the surface of positive-electrode current collector 3 on the side that is opposite to the side on which second positive-electrode active material layers 2B was formed, and then dried, whereby first positive-electrode active material layers 2A were formed. Each first positive-electrode active material layer 2A was configured so as to include flat part $2A_1$ having a thickness of 80 μm, thin-layer part $2A_3$ having a thickness 20 μm and inclined part $2A_2$ whose thickness continuously decreases between flat part $2A_1$ and thin-layer part $2A_3$.

A method of applying an active material to a current collector will be described. As an apparatus that applies active material, any device that utilizes various coating methods including transfer methods or vapor deposition methods, such as doctor blades, die coaters and gravure coaters, may be used. In the present invention, in order to control the position of an end portion of applied active material, it is particularly preferable to use a die coater such as illustrated in FIG. 6. Methods of coating active material that use a die coater are generally classified into two methods: a continuous application method in which active material is continuously formed in the longitudinal direction of a long current collector, and an intermittent coating method in which coated portions coated with active material and uncoated portions not coated with the active material are alternately formed along a longitudinal direction of a current collector.

Figure 13:
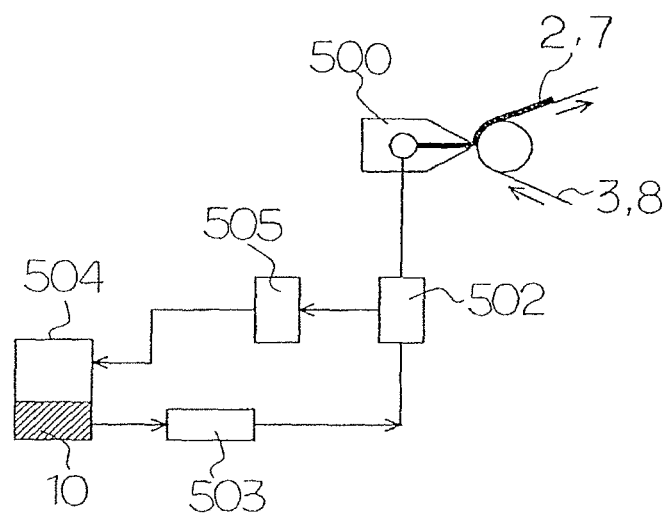
FIG. 13 is a block diagram schematically illustrating an example of an apparatus used for intermittent application of active material.

FIG. 13 is a diagram illustrating an example of a configuration of a die coater that intermittently applies active material. As illustrated in FIG. 13, a slurry flow path of a die coater that performs intermittent coating includes die head 500, coating valve 502 connected to die head 500, pump 503, and tank 504 that stores slurry 200. Also, return valve 505 is provided between tank 504 and coating valve 502. In this configuration, at least for coating valve 502, it is preferable to use a motor valve. A motor valve can vary an open/closed state of the valve with good precision even while slurry 200 is being applied. Therefore, e.g., the flow path of slurry 200 is controlled by coating valve 502, which includes a motor valve, in combination with the operation of return valve 505, enabling a coated portion (flat part $2A_1$, inclined part $2A_2$ or a stepped part and thin-layer part $2A_3$) of each active material, an uncoated portion and a boundary part therebetween to be formed into respective desired shapes.

Figure 14A:
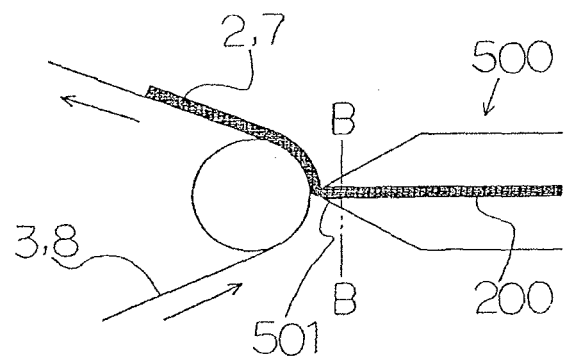
FIG. 14A is a cross-sectional view schematically illustrating an example of an apparatus used for continuous application of active material.
Figure 14B:
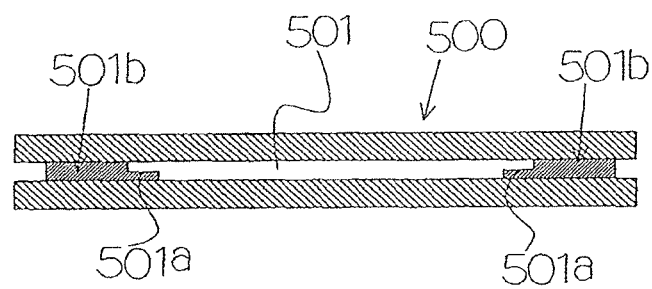
FIG. 14B is an enlarged cross-sectional view along line B-B in FIG. 14B.
Figure 15:
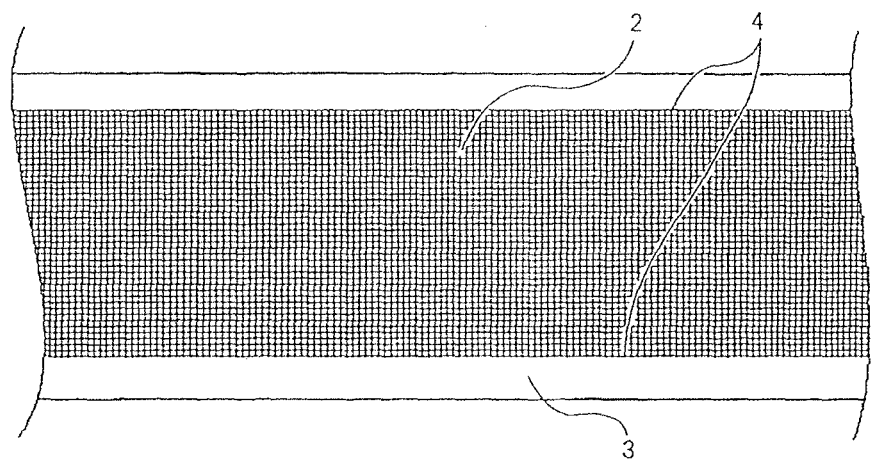
FIG. 15 is a plan view illustrating another example of a positive electrode forming step in a secondary battery manufacturing method according to the present invention.
Figure 16:
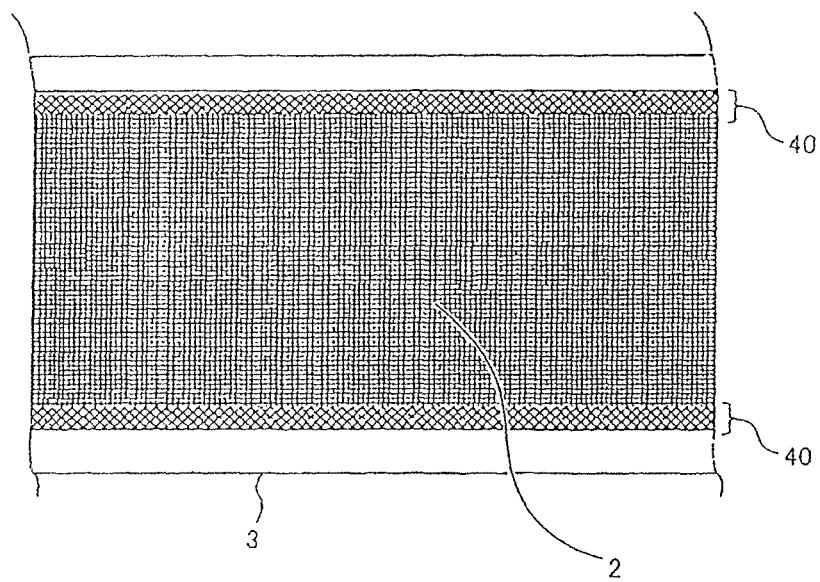
FIG. 16 is a plan view illustrating a step following FIG. 15 in the secondary battery manufacturing method according to the present invention.
Figure 17A:
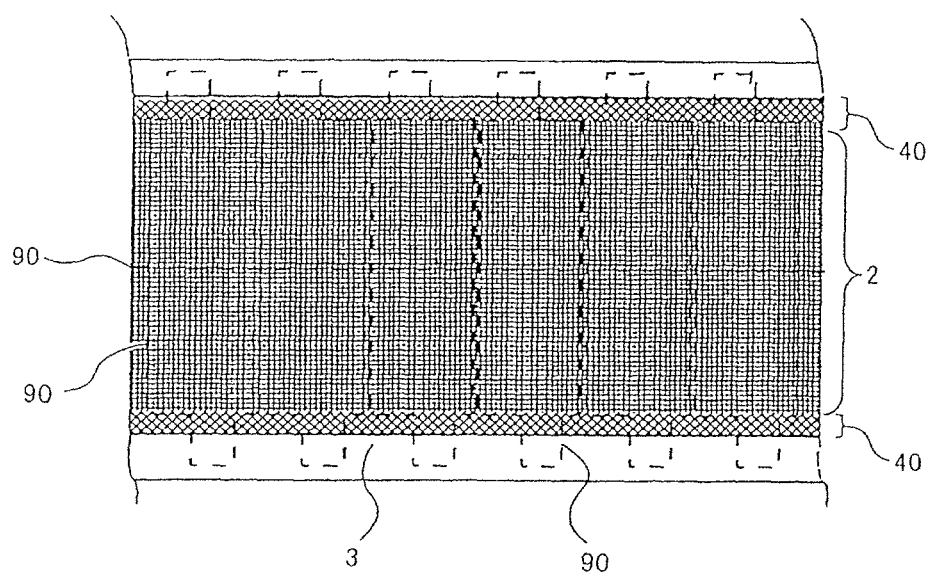
FIG. 17A is a plan view illustrating a step following FIG. 16 in the secondary battery manufacturing method according to the present invention.
Figure 17B:
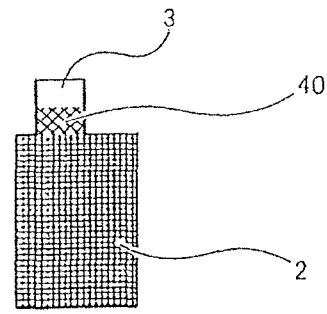
FIG. 17B is a plan view illustrating a positive electrode formed as a result of cutting in the step illustrated in FIG. 17A.

Also, active material can be formed by being continuously applied using the die coater schematically illustrated in FIGS. 14A and 14B. At each of opposite end portions of discharge port 501 of die head 500 of the die coater, shim 501b including a tapered part or stepped part 501a whose thickness decreases toward the center portion of discharge port 501 is provided. Shims 501b enable formation of active material in such a manner that a stepped part or an inclined part and a thin-layer part are formed at an end portion of each coated portion.

After the coating positive-electrode active material 2 on positive-electrode current collector 3 as described above, as illustrated in FIG. 8, polypropylene insulating tape (insulating materials) 40 having a thickness of 30 μm was attached to boundary part 4 between the coated portion and the uncoated portion of each positive electrode 1. Here, insulating tape 40, provided so as to cover boundary part 4 on one surface of each positive-electrode active material 2, was formed so that end portion 40a is positioned on thin-layer part $2A_3$ of relevant first positive-electrode active material layer 2A. Insulating tape 40, provided so as to cover boundary part 4 on another surface of each positive-electrode active material 2, was disposed so that one end portion 40a faces thin-layer part $2A_3$ of relevant first positive-electrode active material layer 2A across positive-electrode current collector 3. Then, as illustrated in FIGS. 9A and 9B, positive-electrode current collector 3 was cut along each cutting line 90 to obtain individual positive electrodes 1.

<Negative Electrodes>

Graphite with a surface coated with an amorphous material was used as negative-electrode active material 7 and PVdF was used as a binder, and a slurry in which a compound agent of these materials is dispersed in an organic solvent was prepared. As illustrated in FIG. 10, the slurry was intermittently applied to a copper foil having a thickness of 15 μm, which is negative-electrode current collector 8, and then dried to fabricate a negative electrode roll including coated portions coated with negative-electrode active material 7 and uncoated portions not coated with negative-electrode active material 7 as with positive electrodes 1. Each negative-electrode active material 7 includes only a flat part having a thickness of 55 μm. A specific method for applying negative-electrode active material 7 is similar to the aforementioned method for applying positive-electrode active material 2, and active material may be intermittently applied using the die coater illustrated in FIG. 13 or may be continuously applied using the die coater illustrated in FIGS. 14A and 14B. Then, as illustrated in FIGS. 11A and 11B, negative-electrode current collector 8 was cut along each cutting line 91 to obtain individual negative electrodes 6. Each negative electrode 6 includes a negative electrode tab, which is an uncoated portion not coated by negative-electrode active material 7, at a position that does not face a positive electrode tab, and negative-electrode current collector 8 was cut at a part that faces a positive electrode tab and that has negative-electrode active materials 7 on both surfaces thereof. Insulating material is not provided at a boundary part between the coated portion and the uncoated portion of each negative electrode 6.

<Manufacturing of Stacked Type Battery>

Obtained positive electrodes 1 and negative electrodes 6 were alternately stacked via separators 20 having a thickness of 25 μm, each separator 20 made of polypropylene, and negative electrode terminal 16 and positive electrode terminal 11 were attached to the stack, which was then housed in an outer container consisting of flexible films 30, whereby a stacked type secondary battery having a thickness of 8 mm was obtained.

Example 2

Using a compound agent containing $LiMn_2O_4$, which is active material 2, carbon black, which is a conductive agent, and PVdF, which is a binder, positive-electrode active material 2 was formed on each of the opposite surfaces of positive-electrode current collector 3. Each first positive-electrode active material layer 2A according to the present example includes a flat part $2A_1$ having a thickness of 35 μm, a thin-layer part $2A_3$ having a thickness of 5 μm, and an inclined part $2A_2$ whose thickness continuously decreases between flat part $2A_1$ and thin-layer part $2A_3$. Each second positive-electrode active material layer 2B includes only a flat part having a thickness of 35 μm. Next, as in example 1, polypropylene insulating tapes (insulating materials) 40 having a thickness of 30 μm were attached and then positive-electrode current collector 3 was cut to obtain individual positive electrodes 1.

Also, using hardly (barely) graphitizable carbon as negative-electrode active material 7, negative-electrode active material 7 was formed on each of the opposite surfaces of negative-electrode current collector 8. Negative-electrode active materials 7 according to the present example, as with first positive-electrode active material 2A, were configured so as to each include a flat part having a thickness of 35 μm, a thin-layer part having a thickness of 5 μm and an inclined part whose thickness continuously decreases from the flat part to the thin-layer part. Then, the inclined part and the thin-layer part of each negative electrode 6 was disposed so as to face inclined part $2A_2$ and thin-layer part $2A_3$ of relevant first positive-electrode active material layer 2A via a relevant separator. The rest of the conditions was made to be similar to those of example 1, and a stacked type secondary battery having a thickness of 3 mm was obtained.

Comparative Example

A positive-electrode active material on each of the opposite surfaces of positive-electrode current collector 3 was formed as a layer having a uniform thickness, the layer having neither a thin-layer part, nor an inclined part, nor a stepped part, and was configured so as to include only a flat part with no inclined part provided. The rest of the conditions was made to be similar to those of example 1, and a stacked type secondary battery was obtained. The thickness of the stacked type battery was approximately 8 mm at the center portion and approximately 9 mm around an end portion.

<Evaluation>

To evaluate the discharge capacities and the cycle characteristics of the stacked type batteries obtained in the above manner, 10 stacked type batteries for each of examples and comparative example were evaluated. It was found that the stacked type batteries according to examples 1 and 2 provide a very stable discharge capacity and cycle characteristics, and that the discharge capacity and cycle characteristics of the battery according to the comparative example are unstable compared to those of the batteries according to examples 1 and 2. The stable battery characteristics can be considered as resulting from preventing or reducing an increase in the thickness of a part of the stacked type battery in which insulating materials 40 are positioned from being increased so as to be larger than a thickness of the rest of the parts and thus enabling the stacked type battery to be held in place while uniform pressure is applied to it.

Figure 18:
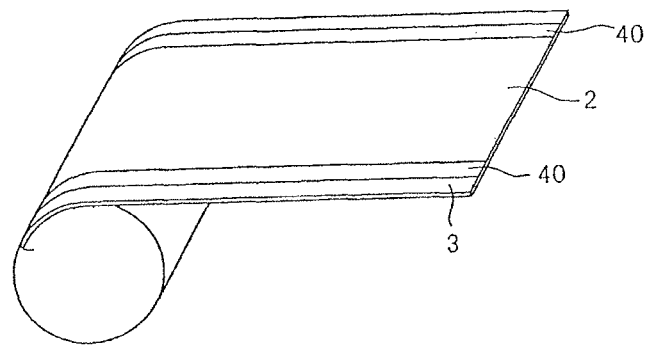
FIG. 18 is a perspective diagram illustrating an electrode roll used in the secondary battery manufacturing method illustrated in FIGS. 15 to 17B.

In each of the above examples, positive-electrode active materials 2 and negative-electrode active materials 7 are formed by being intermittently applied; however, as illustrated in FIGS. 15 to 17B, positive-electrode active materials 2 and negative-electrode active materials 7 may be formed by being continuously applied so as to form active material layer with no intervals over a plurality of electrode forming parts. Where active materials are formed by means of being continuously applied, before the electrodes are cut out along each cutting line 90 in FIG. 17A, they can be kept in the form of an electrode roll as illustrated in FIG. 18, and in such a case, extreme distortion of parts in which insulating materials 40 are disposed can be prevented, thereby enhancing the product quality of the electrodes.

The present invention is useful for manufacturing electrodes for a lithium ion secondary battery and manufacturing a lithium ion secondary battery using such electrodes, and is also effectively employed for a secondary battery other than a lithium ion battery.

The present application claims priority from Japanese Patent Application No. 2013-166462 filed on Aug. 9, 2013, and the entire disclosure of Japanese Patent Application No. 2013-166462 is incorporated herein by reference.

REFERENCE NUMERALS

1 positive electrode
2 positive-electrode active material
2A first positive-electrode active material layer
$2A_1$ flat part
$2A_2$ inclined part
$2A_3$ thin-layer part (small-thickness part)
2B second positive-electrode active material layer
3 positive-electrode current collector
4 boundary part
6 negative electrode
7 negative-electrode active material
8 negative-electrode current collector
20 separator
40 insulating material
100 secondary battery

The invention claimed is:

1. A secondary battery comprising a battery electrode assembly including a positive electrode and a negative electrode alternately stacked via a separator, wherein:
   the positive electrode and the negative electrode each includes a current collector and an active material applied to the current collector;
   the active material which is positioned on one surface of the current collector of the positive electrode, consists essentially of a large-thickness portion and a small-thickness portion, and the small-thickness portion is positioned on an end portion side relative to the large-thickness portion, and the small-thickness portion has a thickness that is smaller than that of the large-thickness portion;

the active material which is positioned on the other surface of the current collector of the positive electrode, has an end portion, and the end portion of the active material which is positioned on the other surface of the current collector, faces the small-thickness portion of the active material positioned on the one surface of the current collector, across the current collector, and consists essentially of a flat portion;

the active material which is positioned on the one surface of the current collector of the positive electrode and the active material which is positioned on the other surface of the current collector of the positive electrode are asymmetric to each other around the current collector, the small-thickness portion of the active material positioned on the one surface of the current collector of the positive electrode includes at least one from among a thin-layer portion, an inclined portion whose thickness continuously decrease, and a stepped portion whose thickness intermittently decrease.

2. The secondary battery according to claim 1, wherein an insulating material is positioned so that: the insulating material covers a boundary part between a coated portion to which the active material has been applied and an uncoated portion to which the active material has not been applied in the positive electrode; and one end portion of the insulating material is positioned on the small-thickness portion of the active material positioned on the one surface of the current collector of the positive electrode.

3. The secondary battery according to claim 2, wherein a difference in thickness between the large-thickness portion and the small-thickness portion of the active material positioned on the one surface of the current collector of the positive electrode is equal to or larger than a thickness of the insulating material.

4. The secondary battery according to claim 3, wherein the insulating material is provided on each of the opposite surfaces of the current collector of the positive electrode, and the difference in thickness between the large-thickness portion and the small-thickness portion of the active material positioned on the one surface of the current collector of the positive electrode is no less than twice the thickness of the insulating material.

5. The secondary battery according to claim 2, wherein a total sum of the thickness of the insulating material, a thickness of a part of the active material on the one surface of the current collector of the positive electrode on which the insulating material is disposed, and a thickness of a part of the active material of the negative electrode, which faces the insulating material across the separator, is equal to or smaller than a total sum of the thickness of the large-thickness portion of the active material of the positive electrode and a thickness of a part of the active material of the negative electrode, which faces the large-thickness portion of the active material of the positive electrode across the separator.

6. The secondary battery according to claim 1, wherein the active material positioned on the other surface of the current collector of the positive electrode consists essentially of only the flat portion.

7. The secondary battery according to claim 1, wherein:
the active material which is positioned on one surface of the current collector of the negative electrode, consists essentially of a large-thickness portion and a small-thickness portion having a thickness that is smaller than that of the large-thickness portion; and
the active material which is positioned on the other surface of the current collector of the negative electrode, has an end portion, and the end portion of the active material which is positioned on the other surface of the current collector, faces the small-thickness portion of the active material positioned on the one surface, across the current collector, and consists essentially of a flat portion.

8. The secondary battery according to claim 7, wherein the small-thickness portion of the active material positioned on the one surface of the current collector of the negative electrode faces an insulating material positioned on the active material of the positive electrode, across the separator.

* * * * *